US011197356B2

United States Patent
Ichikawa et al.

(10) Patent No.: US 11,197,356 B2
(45) Date of Patent: Dec. 7, 2021

(54) LIGHTING CIRCUIT AND VEHICLE LAMP

(71) Applicant: KOITO MANUFACTURING CO., LTD., Tokyo (JP)

(72) Inventors: Tomoyuki Ichikawa, Shizuoka (JP); Masato Harazaki, Shizuoka (JP)

(73) Assignee: KOITO MANUFACIURING CO., LTD., Tokyo (JP)

( * ) Notice: Subject to any disclaimer, the term of this patent is extended or adjusted under 35 U.S.C. 154(b) by 0 days.

(21) Appl. No.: 17/258,553

(22) PCT Filed: Jul. 16, 2019

(86) PCT No.: PCT/JP2019/027878
§ 371 (c)(1),
(2) Date: Jan. 7, 2021

(87) PCT Pub. No.: WO2020/017492
PCT Pub. Date: Jan. 23, 2020

(65) Prior Publication Data
US 2021/0153314 A1    May 20, 2021

(30) Foreign Application Priority Data
Jul. 19, 2018  (JP) .............................. JP2018-135583

(51) Int. Cl.
*H05B 45/18*      (2020.01)
*B60Q 1/30*      (2006.01)

(52) U.S. Cl.
CPC ............... *H05B 45/18* (2020.01); *B60Q 1/30* (2013.01)

(58) Field of Classification Search
CPC .......... H05B 45/18; H05B 45/00; B60Q 1/30; B60Q 1/44
See application file for complete search history.

(56) References Cited

U.S. PATENT DOCUMENTS

| 2010/0033113 A1* | 2/2010 | Maruyama ........... H05B 45/395 315/309 |
| 2016/0044760 A1* | 2/2016 | Robert .................. H05B 45/14 315/151 |
| 2018/0073714 A1 | 3/2018 | Ozawa et al. |

FOREIGN PATENT DOCUMENTS

| JP | 2010-118295 A | 5/2010 |
| JP | 2012-240492 A | 12/2012 |
| JP | 2014-235967 A | 12/2014 |
| JP | 2015-022879 A | 2/2015 |

(Continued)

OTHER PUBLICATIONS

Takeda et al. English Translation of JP2010118295 A, "Lighting Control Device of Vehicle Lamp", May 27, 2010, pp. 1-18 (Year: 2010).*

(Continued)

*Primary Examiner* — Daniel D Chang
(74) *Attorney, Agent, or Firm* — Sughrue Mion, PLLC

(57) ABSTRACT

This lighting circuit comprises a current source and a thermal sensing element. The thermal sensing element senses the temperature of a semiconductor light source. The current source generates a drive current that shows a positive correlation with the temperature when the temperature is in a normal range and that shows a negative correlation with the temperature when the temperature falls within a temperature range higher than the normal range.

10 Claims, 7 Drawing Sheets

(56) References Cited

FOREIGN PATENT DOCUMENTS

WO 2016158423 A1 10/2016

OTHER PUBLICATIONS

Written Opinion (PCT/ISA/237) issued by the International Searching Authority in corresponding International Application No. PCT/JP2019/027878, dated Sep. 10, 2019.
International Search Report (PCT/ISA/210), issued by International Searching Authority in corresponding International Application No. PCT/JP2019/027878, dated Sep. 10, 2019.

* cited by examiner

LIGHTING CIRCUIT AND VEHICLE LAMP

TECHNICAL FIELD

The present disclosure relates to a lamp used in an automobile and the like.

BACKGROUND ART

In the related art, light bulbs are widely used as a light source for vehicle lamps, but in recent years, semiconductor light sources such as a light emitting diode (LED) are widely adopted. The brightness of the LED can be controlled according to a drive current flowing therethrough. Therefore, in the related art, a constant current series regulator or a step-down switching converter with a constant current output is used to perform constant current control that stabilizes the drive current to a target amount according to a target brightness.

CITATION LIST

Patent Literature

Patent Literature 1: WO 2016/158423

SUMMARY OF INVENTION

Technical Problem

A relationship between the brightness of the semiconductor light source and the drive current has temperature dependence. Specifically, the brightness when the same drive current is supplied to the semiconductor light source decreases as the temperature rises. Therefore, when the semiconductor light source is subjected to the constant current control, the brightness decreases as the temperature rises.

The present disclosure is to improve stability of brightness of a semiconductor light source.

Solution to Problem

One aspect of the present disclosure relates to a lighting circuit that drives a semiconductor light source. The lighting circuit includes a thermal sensing element whose electrical state changes according to temperature of a semiconductor light source, and a current source that generates a drive current that shows a positive correlation with the temperature when the temperature is in a normal range and that shows a negative correlation with the temperature when the temperature falls within a high temperature range higher than the normal range.

Any combination of the above configuration elements, and the configuration elements and expressions of the present disclosure substituted in methods, apparatus, systems, or the like are also effective as aspects of the present disclosure.

Advantageous Effects of Invention

According to the present disclosure, stability of brightness of a semiconductor light source can be improved.

DESCRIPTION OF EMBODIMENTS

Overview of Embodiments

Figure 1:
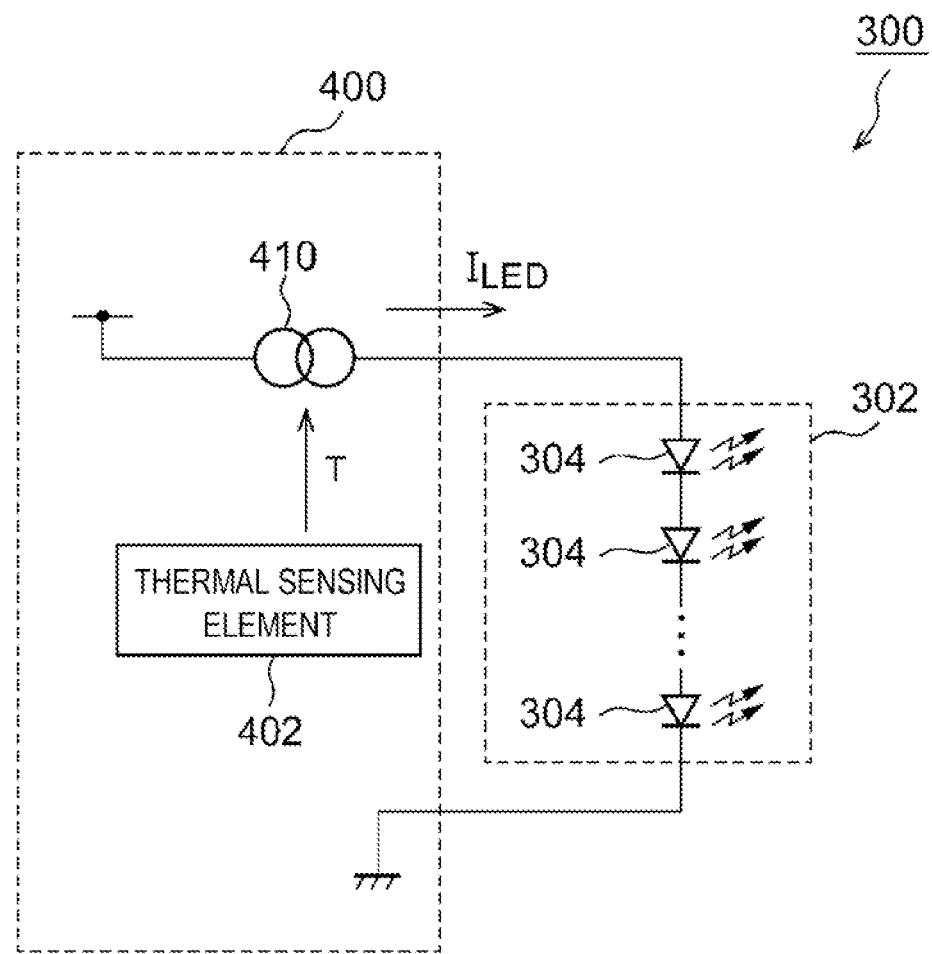
FIG. 1 is a block diagram of a vehicle lamp including a lighting circuit according to an embodiment.

One embodiment disclosed in the description relates to a lighting circuit. The lighting circuit includes a thermal sensing element whose electrical state changes according to temperature of a semiconductor light source, and a current source that generates a drive current that shows a positive correlation with the temperature when the temperature is in a normal range and that shows a negative correlation with the temperature when the temperature falls within a high temperature range higher than the normal range.

The lighting circuit may further include a dimming circuit that generates a dimming voltage indicating a target amount of the drive current according to the state of the thermal sensing element. The current source may generate a drive current that changes linearly with respect to the dimming voltage. The temperature dependence of the drive current can be set based on the temperature dependence of the dimming voltage.

The dimming circuit may include a reference voltage generation circuit that generates a reference voltage which is substantially constant in the normal range and decreases with temperature in the high temperature range, a voltage-current conversion circuit that converts the reference voltage into a reference current with a gain according to the temperature, and a current-voltage conversion circuit that converts the reference current to the dimming voltage.

The reference voltage generation circuit may include a voltage dividing circuit that divides the power supply voltage and a clamp circuit that clamps a voltage of an output node of the voltage dividing circuit equal to or less than an upper limit voltage according to the temperature.

The clamp circuit may include a first transistor provided between the output node of the voltage dividing circuit and the ground, a first resistor provided between a power supply line and a control terminal of the first transistor, and a first thermistor provided between the control terminal of the first transistor and the ground and having a negative temperature coefficient.

The voltage-current conversion circuit may include a second transistor, a second resistor provided between the second transistor and the ground, a second thermistor arranged in parallel with the second resistor and having a negative temperature coefficient, and a first operational amplifier in which an output is connected to the control terminal of the second transistor, the reference voltage is received at a first input, and a voltage of a connection node between the second transistor and the second resistor is fed back to a second input.

The current-voltage conversion circuit may include a third resistor provided on a path of the reference current. The dimming voltage may depend on a voltage between both ends of the third resistor.

The current source may include a switching converter, and a controller that controls the switching converter so that a current detection signal indicating the drive current approaches the dimming voltage.

The lighting circuit may include a first temperature detecting unit that significantly changes the drive current according to the temperature of the semiconductor light source in the normal range, and a second temperature detecting unit that significantly changes the drive current according to the temperature of the semiconductor light source in the high temperature range. The first temperature detecting unit may include the second resistor, and the second thermistor connected in parallel with the second resistor and having a negative temperature coefficient. The second temperature detecting unit may include the first resistor and the first thermistor having a negative temperature coefficient, which are provided in series between two lines having different potentials.

Embodiments

Hereinafter, the present disclosure will be described based on preferred embodiments with reference to the drawings. The same or equivalent components, members, and processing shown in the drawings are denoted by the same reference numerals, and a repetitive description thereof is omitted. Also, the embodiments are not intended to limit the scope of the present invention and are merely for illustration, and all features described in the embodiments and combinations thereof are not necessarily essential features of the present invention.

In the present description, a "state in which a member A is connected to a member B" includes a case where the member A and the member B are physically directly connected. Further, the "state in which a member A is connected to a member B" also includes a case where the member A and the member B are connected indirectly via other members without causing substantial effects on an electrical connection state therebetween, or impairing functions or effects obtained by the connection therebetween.

Similarly, a "state in which a member C is provided between a member A and a member B" includes a case where the member A and the member C or the member B and the member C are directly connected. Further, the "state in which a member C is provided between a member A and a member B" also includes a case where the members are connected indirectly via other members without causing substantial effects on an electrical connection state therebetween, or impairing functions or effects obtained by the connection therebetween.

In the present description, reference numerals given to electrical signals such as voltage signals and current signals, or circuit elements such as resistors and capacitors represent voltage values and current values, or resistance values and capacitance values as necessary.

FIG. 1 is a block diagram of a vehicle lamp 300 including a lighting circuit 400 according to an embodiment. The vehicle lamp 300 includes a semiconductor light source 302 and the lighting circuit 400. The semiconductor light source 302 includes one or a plurality of light emitting elements 304 connected in series and/or in parallel. The light emitting element 304 is preferably, for example, an LED, but is not limited thereto. The vehicle lamp 300 may be, for example, a stop lamp or a tail lamp, and the semiconductor light source 302 may be a red LED. One aspect of the vehicle lamp 300 is an LED socket in which the semiconductor light source 302 and the lighting circuit 400 are accommodated in one package, and has a shape that can be attached to and detached from a lamp body (not shown).

The lighting circuit 400 mainly includes a thermal sensing element 402 and a current source 410. The thermal sensing element 402 is provided to sense the temperature T of the semiconductor light source 302. The thermal sensing element 402 is provided such that an electrical state thereof changes according to a temperature T of the semiconductor light source 302. The electrical state of the thermal sensing element refers to impedance of the thermal sensing element, a voltage drop thereof, a current flowing therethrough, a voltage at one end thereof, and the like. The thermal sensing element 402 can directly or indirectly monitor the temperature of the semiconductor light source 302. As the thermal sensing element 402, for example, the thermal sensing element 402 may be directly attached to the semiconductor light source 302. Further, the thermal sensing element 402 may be mounted adjacent to or close to the same substrate as the semiconductor light source 302, or may be mounted on a heat sink to which the semiconductor light source 302 is mounted, for example. The current source 410 generates a drive current (lamp current) $I_{LED}$ that shows a positive correlation with the temperature T when the temperature T is in a normal range and that shows a negative correlation with the temperature T when the temperature T falls within a high temperature range higher than the normal range. The normal range is an assumed operating temperature range, and the high temperature range is a temperature range in which there is a concern that the reliability of the semiconductor light source 302 may be deteriorated. FIG. 1 shows a form in which the current source 410 sources (discharge) the drive current $I_{LED}$, but the form is not limited thereto, and the current source 410 may sink (suction) the drive current $I_{LED}$.

Figure 2A:
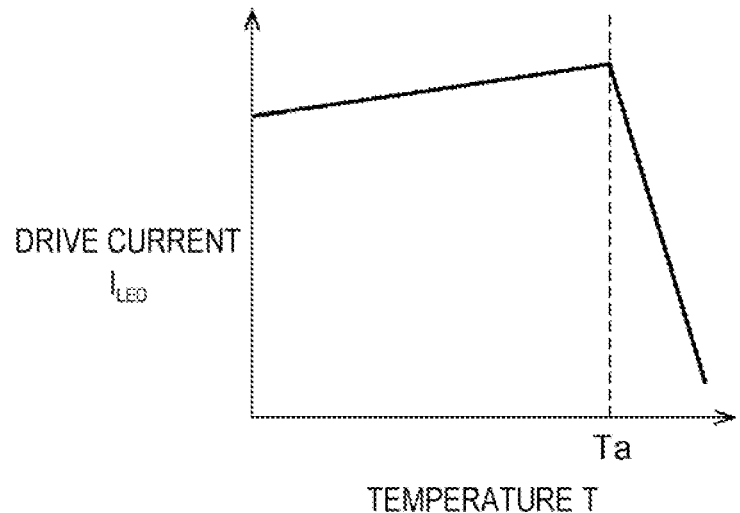
FIG. 2A is a diagram illustrating operation of the vehicle lamp of FIG. 1.
Figure 2B:
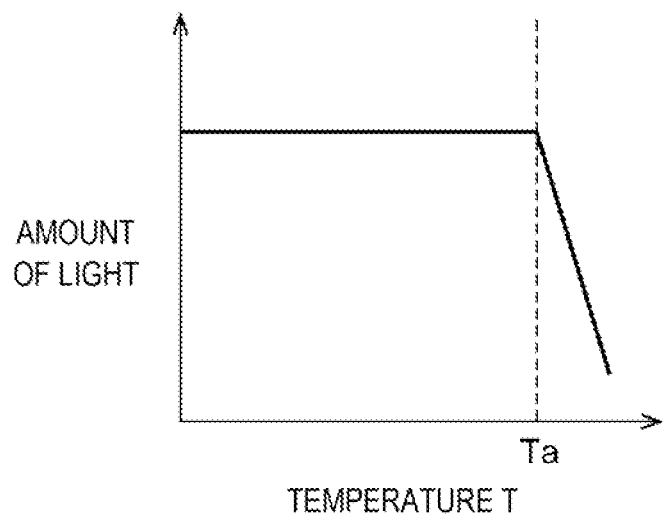
FIG. 2B is a diagram illustrating operation of the vehicle lamp of FIG. 1.

The basic configuration of the lighting circuit 400 is described above. Next, operation of the lighting circuit 400 is described. FIGS. 2A and 2B are diagrams illustrating operation of the vehicle lamp 300 of FIG. 1. FIG. 2A shows a relationship between the temperature T and the drive current $I_{LED}$. Referring to FIG. 2A, a range where the temperature T is lower than a certain threshold value Ta is the normal range, and a range where the temperature T is higher than the threshold value Ta is the high temperature range. In the normal range, the drive current $I_{LED}$ shows an upward-sloping characteristic with respect to the temperature T. A slope of the drive current $I_{LED}$ with respect to the temperature T is determined such that the temperature characteristic of the semiconductor light source 302 is cancelled.

When the temperature T falls within the high temperature range, the drive current $I_{LED}$ shows a downward-sloping characteristic with respect to the temperature T. This characteristic is also referred to as temperature derating. An absolute value of the slope in the high temperature range is larger than an absolute value of the slope in the normal range.

FIG. 2B the temperature T and an amount of light. In the normal range, the amount of light can be kept substantially constant by increasing the drive current $I_{LED}$ according to the temperature T. When the temperature T falls within the high temperature range, the semiconductor light source 302 can be prevented from further generating heat by reducing the drive current $I_{LED}$.

The operation of the vehicle lamp 300 is described above. According to the vehicle lamp 300, the stability of the amount of light can be improved while ensuring the reliability of the semiconductor light source 302. In particular, the temperature dependence of the brightness of the red LED is remarkable as compared with other elements. Therefore, by applying the present disclosure to a stop lamp and a tail lamp, the commercial value can be enhanced.

The present disclosure extends to various devices and methods ascertained as the block diagram and the circuit diagram of FIG. 1, or derived from the above description, and is not limited to a specific configuration. Hereinafter, in order to facilitate understanding of the essence and operation of the invention and clarify them, more specific configuration examples and embodiments are described in detail, which is not intended to narrow the scope of the present disclosure.

First Embodiment

Figure 3:
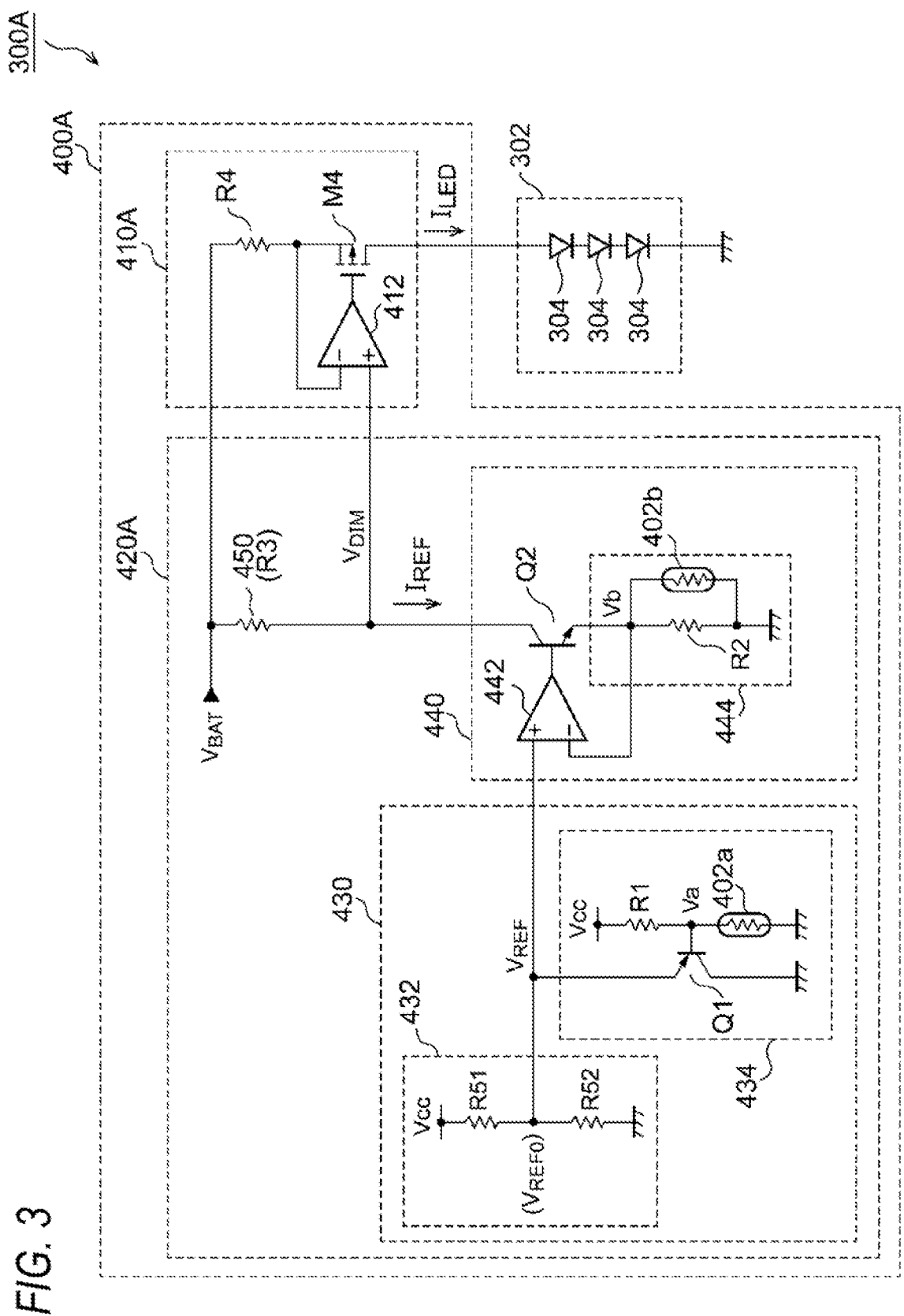
FIG. 3 is a block diagram of a vehicle lamp according to a first embodiment.

FIG. 3 is a block diagram of a vehicle lamp 300A according to a first embodiment. A lighting circuit 400A includes a current source 410A and a dimming circuit 420A. The dimming circuit 420A includes a thermal sensing element 402 (first thermistor 402a, second thermistor 402b), and generates a dimming voltage $V_{DIM}$ indicating a target amount of a drive current $I_{LED}$ according to a state of the thermal sensing element 402. The current source 410A generates the drive current $I_{LED}$ that changes linearly with respect to the dimming voltage $V_{DIM}$.

The dimming circuit 420A includes a reference voltage generation circuit 430, a V/I conversion circuit 440, and an I/V conversion circuit 450. The reference voltage generation circuit 430 generates a reference voltage $V_{REF}$ that is substantially constant in a normal range and decreases with temperature T in a high temperature range. The V/I conversion circuit 440 converts the reference voltage $V_{REF}$ into a reference current $I_{REF}$ with a conversion gain (conductance) g corresponding to the temperature T.

$$I_{REF}=g \times V_{REF}$$

The I/V conversion circuit 450 converts the reference current $I_{REF}$ into the dimming voltage $V_{DIM}$.

The reference voltage generation circuit 430 includes a voltage dividing circuit 432 and a clamp circuit 434. The voltage dividing circuit 432 divides a power supply voltage $V_{CC}$ and generates the reference voltage $V_{REF}$. The clamp circuit 434 clamps the reference voltage $V_{REF}$ equal to or less than an upper limit voltage corresponding to the temperature T. A reference voltage $V_{REF0}$ when the clamp circuit 434 is ignored is expressed by the following equation.

$$V_{REF0}=V_{CC} \times R51/(R51+R52)$$

The clamp circuit 434 includes a first transistor Q1, a first resistor R1, and the first thermistor 402a. The first transistor Q1 is a PNP type bipolar transistor, which is provided between an output node of the voltage dividing circuit 432 and the ground. The first resistor R1 and the first thermistor 402a form a second temperature detecting unit. The first resistor R1 and the first thermistor 402a generate a first detection signal Va that changes significantly according to the temperature T of the semiconductor light source 302 in the high temperature range, and bias a control terminal (base) of the first transistor Q1 according to the temperature T. A P-channel MOSFET may be used as the first transistor Q1. Alternatively, instead of the first transistor Q1, a diode that receives the reference voltage $V_{REF}$ at the anode and receives the first detection signal Va at the cathode may be provided.

The first thermistor 402a corresponds to the thermal sensing element 402 in FIG. 1, and mainly determines a slope of the drive current $I_{LED}$ in the high temperature range. A resistance value Ra of the first thermistor 402a has a negative temperature coefficient (NTC). When a voltage of a connection node between the first resistor R1 and the first thermistor 402a is Va, the reference voltage $V_{REF}$ is clamped with Va+Vf as an upper limit.

When the temperature T is in the normal range, Va+Vf>$V_{REF0}$ is satisfied, so that $V_{REF}=V_{REF0}$, which is a constant value independent of temperature.

When the temperature T falls within the high temperature range, Va+Vf<$V_{REF0}$ is satisfied, the clamp becomes effective, and $V_{REF}$=Va+Vf. That is, as the temperature rises, Va decreases, and therefore the reference voltage $V_{REF}$ also decreases.

The V/I conversion circuit 440 includes a second transistor Q2, a second resistor R2, a second thermistor 402b, and an operational amplifier 442. The operational amplifier 442 is an example of the first operational amplifier. The second transistor Q2 is an NPN type bipolar transistor. The second resistor R2 is provided between the second transistor Q2 and the ground. The second thermistor 402b is provided in parallel with the second resistor R2, and a resistance value Rb thereof has a negative temperature coefficient.

The operational amplifier 442 is configured such that an output is connected to the control terminal (base) of the second transistor Q2, the reference voltage $V_{REF}$ is received at a first input (non-inverting input terminal), and a voltage Vb of a connection node between the second transistor Q2, the second resistor R2 and the second thermistor 402b is fed back to a second input (inverting input terminal).

When a combined resistance of the second resistor R2 and the second thermistor 402b is Rx, the reference current $I_{REF}$ is expressed by the following equation.

$$I_{REF}=V_{REF}/RX$$

That is, the V/I conversion circuit 440 has the conductance (gain) g corresponding to the temperature T.

$$g=1/Rx$$

When the temperature T rises, the resistance value Rb of the second thermistor 402b, and consequently the combined resistance value Rx decrease, and the reference current $I_{REF}$ increases. From another point of view, the second resistor R2 and the second thermistor 402b form a first temperature detecting unit 444. The second resistor R2 and the second thermistor 402b significantly change the reference current $I_{REF}$, and consequently the drive current $I_{LED}$ in response to the temperature T in the normal range.

The I/V conversion circuit 450 includes a third resistor R3. The third resistor R3 is provided on a path of the reference current $I_{REF}$. The dimming voltage $V_{DIM}$ responds to the voltage drop of the third resistor R3.

$$V_{DIM}=V_{BAT}-R3 \times I_{REF}$$

The current source 410A is a source type, includes a resistor R4, a transistor M4, and an operational amplifier 412, and generates a drive current $I_{LED}$ proportional to a potential difference of the I/V conversion circuit 450.

$$I_{LED} = I_{REF} \times R3/R4$$

$$= V_{REF} \times g \times R3/R4$$

Figure 4:
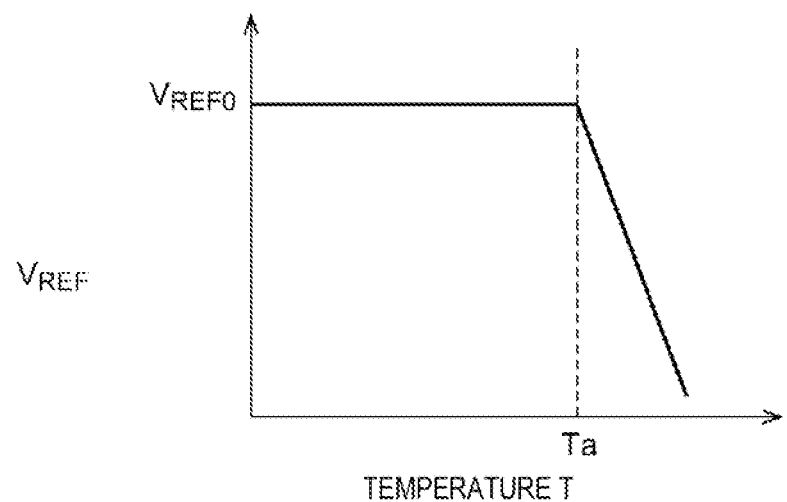
FIG. 4 is a diagram illustrating operation of a dimming circuit of FIG. 3.
Figure 4:
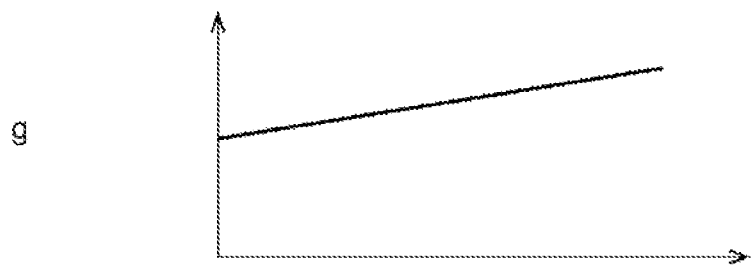
Figure 4:
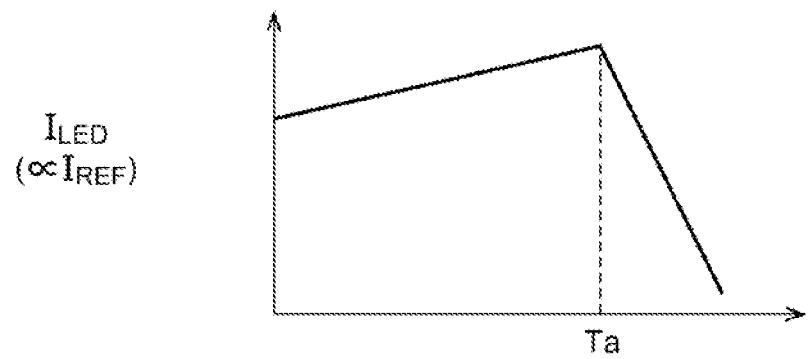

FIG. 4 is a diagram illustrating operation of the dimming circuit 420A of FIG. 3. The reference voltage $V_{REF}$ is substantially constant when T<Ta, and decreases with temperature when T>Ta. The gain g of the V/I conversion circuit 440 shows an upward-sloping characteristic with respect to the temperature T. Therefore, the reference current $I_{REF}$ and the drive current $I_{LED}$ proportional to the reference current $I_{REF}$ show an upward-sloping characteristic when T<Ta, and show an downward-sloping characteristic when T>Ta.

According to the first embodiment, both stability and reliability of the brightness of the semiconductor light source can be achieved.

Second Embodiment

Figure 5:
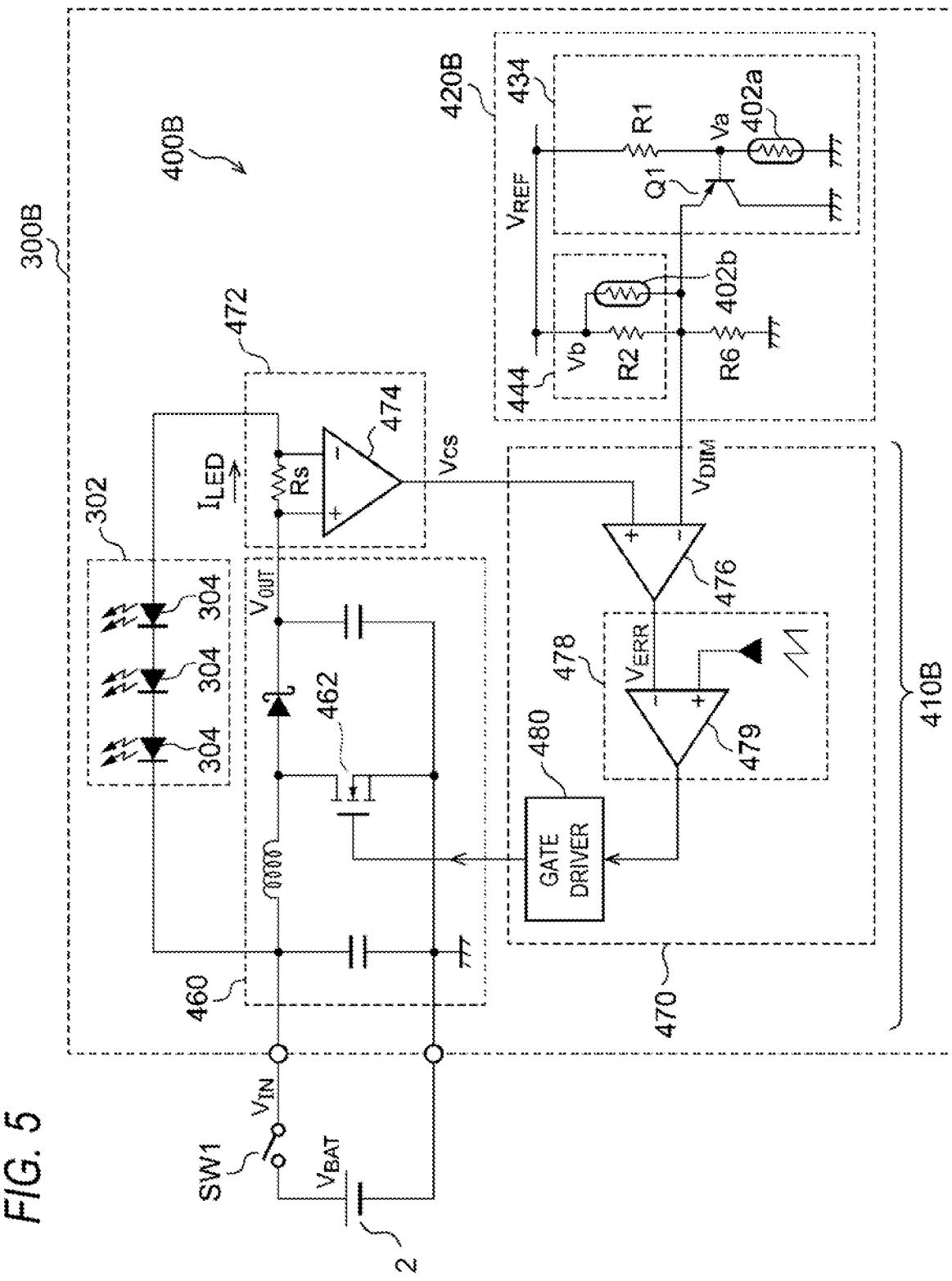
FIG. 5 is a block diagram of a vehicle lamp according to a second embodiment.

FIG. 5 is a block diagram of a vehicle lamp 300B according to a second embodiment. The vehicle lamp 300B receives, as an input voltage $V_{IN}$, a DC voltage (battery voltage $V_{BAT}$) from a battery 2 via a switch SW1. The vehicle lamp 300B includes the semiconductor light source 302 and a lighting circuit 400.

The current source 410B includes a switching converter 460 and a controller 470 thereof. The switching converter 460 is a boost converter that boosts the input voltage $V_{IN}$ to generate an output voltage $V_{OUT}$. In the present embodiment, the semiconductor light source 302 is provided between an input terminal and an output terminal of the switching converter 460, but the configuration is not limited thereto, and the cathode of the semiconductor light source 302 may be grounded.

A current detection circuit 472 generates a current detection signal $V_{CS}$ proportional to the drive current $I_{LED}$. The current detection circuit 472 may include a sense resistor Rs inserted on a path of the drive current $I_{LED}$, and a sense amplifier 474 that amplifies the voltage drop of the sense resistor Rs.

The controller 470 controls the switching converter 460 so that the current detection signal $V_{CS}$ indicating the drive current $I_{LED}$ approaches the dimming voltage $V_{DIM}$. An error amplifier 476 amplifies an error between the current detection signal $V_{CS}$ and the dimming voltage $V_{DIM}$. A pulse modulator 478 generates a pulse signal according to an error voltage $V_{ERR}$. For example, the pulse modulator 478 is a pulse width modulator that generates a pulse signal with a duty ratio corresponding to the error voltage $V_{ERR}$. The pulse modulator 478 may include a PWM comparator 479 that compares the error voltage $V_{ERR}$ with a periodic signal having a triangular or ramp waveform. The pulse modulator 478 may be a pulse frequency modulator or other modulators, and a known technique may be used.

A gate driver 480 drives a switching transistor 462 of the switching converter 460 in response to an output pulse of the pulse modulator 478.

Next, a dimming circuit 420B is described. The dimming circuit 420B includes the second resistor R2, the second thermistor 402b arranged in parallel with the second resistor R2, a sixth resistor R6, and the clamp circuit 434. The configuration of the clamp circuit 434 is the same as that in FIG. 3. The combined resistance of the second resistor R2 and the second thermistor 402b is Rx.

A dimming voltage $V_{DIM0}$ when the first transistor Q1 is off is expressed by the following equation.

$$V_{DIM0} = V_{REF} \times R6/(Rx+R6)$$

When a voltage of a connection node between the first resistor R1 and the first thermistor 402a is Va, the dimming voltage $V_{DIM}$ is clamped with Va+Vf as an upper limit.

When the temperature T is in the normal range, Va+Vf>$V_{DIM0}$ is satisfied, so that $V_{DIM}=V_{DIM0}$, which is a constant value independent of temperature.

When the temperature T falls within the high temperature range, Va+Vf<$V_{DIM0}$ is satisfied, the clamp becomes effective, and $V_{DIM}$=Va+Vf. That is, as the temperature rises, Va decreases, and therefore the dimming voltage $V_{DIM}$ also decreases.

According to the vehicle lamp 300B of FIG. 5, both the reliability of the semiconductor light source and the stability of the brightness can be achieved as in the first embodiment.

Figure 6A:
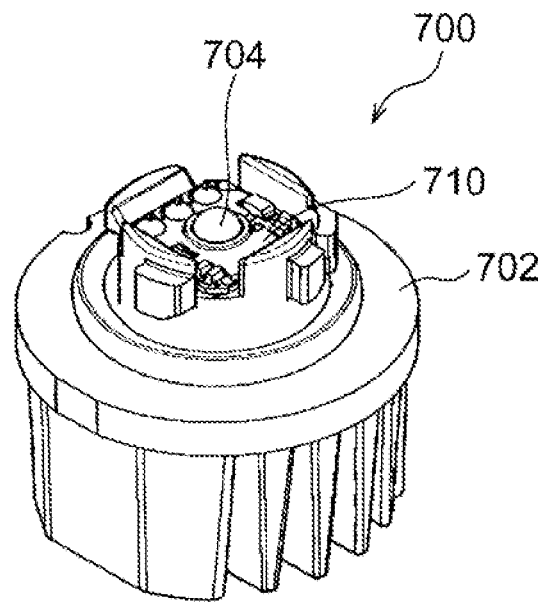
FIG. 6A is a diagram showing an LED socket which is an example of the vehicle lamp.
Figure 6B:
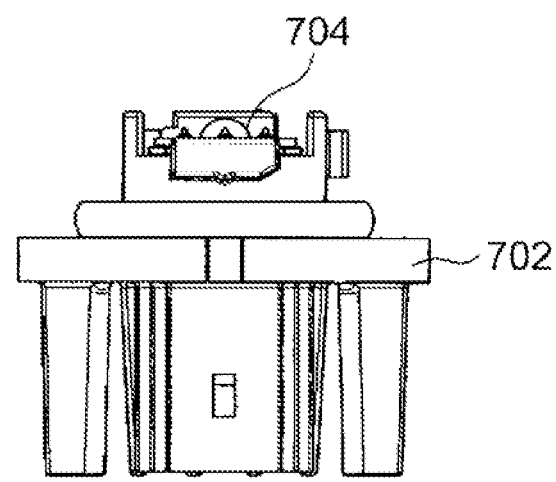
FIG. 6B is a diagram showing the LED socket which is an example of the vehicle lamp.
Figure 6C:
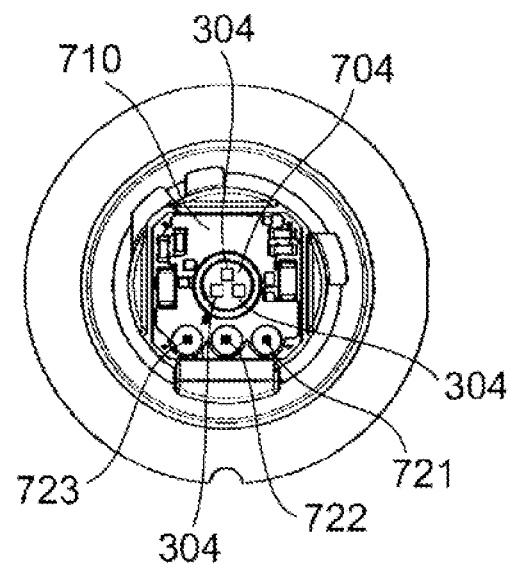
FIG. 6C is a diagram showing the LED socket which is an example of the vehicle lamp.
Figure 6D:
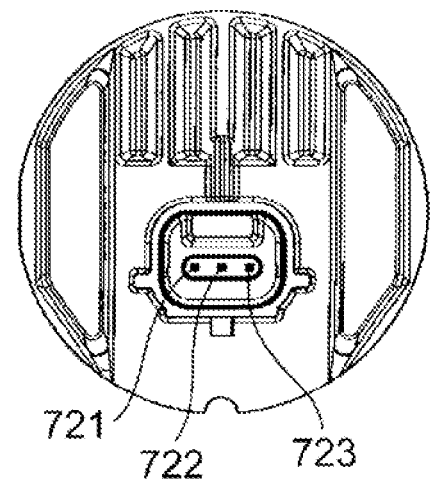
FIG. 6D is a diagram showing the LED socket which is an example of the vehicle lamp.

FIGS. 6A to 6D are diagrams showing an LED socket 700 which is an example of the vehicle lamp 300. FIG. 6A is a perspective view of an appearance of the LED socket 700. FIG. 6B shows a front view of the LED socket 700. FIG. 6C shows a plan view of the LED socket 700. FIG. 6D shows a bottom view of the LED socket 700.

A housing 702 has a shape that can be attached to and detached from a lamp body (not shown). A plurality of light emitting elements 304 constituting the semiconductor light source 302 are mounted in a central portion, and are covered with a transparent cover 704. Components of the lighting circuit 400 are mounted on a substrate 710. The plurality of light emitting elements 304 are red LED chips and are used as stop lamps.

In the LED socket that is used for both a stop lamp and a tail lamp, a light emitting element for the tail lamp is mounted in the center of the plurality of light emitting elements 304, and the lighting circuit for the tail lamp is mounted on the substrate 710.

Three pins 721, 722, and 723 are exposed on a bottom side of the housing 702. A first input voltage $V_{IN1}$ is supplied to the pin 721 via a switch, and a ground voltage is supplied to the pin 722. The pin 723 is supplied with a second input voltage $V_{IN2}$, which becomes high when the tail lamp is turned on. The pins 721 to 723 penetrate the inside of the housing 702, and one end thereof is connected to a wiring pattern of the substrate 710.

Although the present disclosure has been described with specific words and phrases based on the embodiments, the embodiments merely show the principle and application of the present disclosure, and various changes of modifications and configurations may be made in the embodiments without departing from the spirit of the present disclosure as defined in the claims.

First Modification

A configuration of the current source 410 is not limited to those described in the embodiments, and other known circuit configurations can be adopted. For example, when the number of diodes included in the semiconductor light source 302 is small, a step-down converter may be used.

Second Modification

In the embodiments, an NTC thermistor having a negative temperature coefficient is used as the thermal sensing element, but the present disclosure is not limited thereto, and a PTC thermistor (posistor) may be used. Alternatively, the thermal sensing element may adopt a diode temperature sensor utilizing the fact that a voltage between both ends when a constant current passes through a PN junction (that is, the diode) has temperature dependence.

Third Modification

In the embodiments, the drive current $I_{LED}$ is changed by analog dimming (linear dimming) based on the dimming voltage $V_{DIM}$, but the present disclosure is not limited thereto, and PWM dimming may be used. In this case, the drive current $I_{LED}$ may be generated by generating a dimming pulse having a duty ratio corresponding to the dimming voltage $V_{DIM}$ and switching a constant current stabilized to a constant amount based on the dimming pulse.

Fourth Modification

The analog dimming and the PWM dimming may be combined. For example, the temperature derating in the high temperature range may be performed by the analog dimming, and brightness in the normal range may be stabilized by the PWM dimming. Alternatively, the usage of the analog dimming and the PWM dimming may be reversed.

This application is based on Japanese Patent Application No. 2018-135583 filed on Jul. 19, 2018, the contents of which are incorporated herein by reference.

The invention claimed is:

1. A lighting circuit, comprising:
a thermal sensing element whose electrical state changes according to temperature of a semiconductor light source;
a current source configured to generate a drive current that shows a positive correlation with the temperature when the temperature is in a normal range and that shows a negative correlation with the temperature when the temperature falls within a high temperature range higher than the normal range; and
a dimming circuit configured to generate a dimming voltage indicating a target amount of the drive current according to a state of the thermal sensing element,
wherein the current source is configured to generate the drive current that changes linearly with respect to the dimming voltage.

2. The lighting circuit according to claim 1,
wherein the dimming circuit includes:
a reference voltage generation circuit configured to generate a reference voltage that is substantially constant in the normal range and decreases with temperature in the high temperature range;
a voltage-current conversion circuit configured to convert the reference voltage into a reference current with a gain corresponding to the temperature; and
a current-voltage conversion circuit configured to convert the reference current into the dimming voltage.

3. The lighting circuit according to claim 2,
wherein the reference voltage generation circuit includes:
a voltage dividing circuit configured to divide power supply voltage; and
a clamp circuit configured to clamp a voltage of an output node of the voltage dividing circuit equal to or less than an upper limit voltage according to the temperature.

4. The lighting circuit according to claim 2,
wherein the voltage-current conversion circuit includes:
a second transistor;
a second resistor provided between the second transistor and ground;
a second thermistor arranged in parallel with the second resistor and having a negative temperature coefficient; and
a first operational amplifier in which an output is connected to a control terminal of the second transistor, the reference voltage is received at a first input, and a voltage of a connection node between the second transistor and the second resistor is fed back to a second input.

5. The lighting circuit according to claim 1,
wherein the current source includes:
a switching converter; and
a controller configured to control the switching converter so that a current detection signal indicating the drive current approaches the dimming voltage.

6. The lighting circuit according to claim 1, further comprising:
a first temperature detecting unit configured to significantly change the drive current according to the temperature in the normal range; and
a second temperature detecting unit configured to significantly change the drive current according to the temperature in the high temperature range.

7. The lighting circuit according to claim 6,
wherein the first temperature detecting unit includes a second resistor, and a second thermistor connected in parallel with the second resistor and having a negative temperature coefficient.

8. The lighting circuit according to claim 6,
wherein the second temperature detecting unit includes a first resistor, and a first thermistor having a negative temperature coefficient, which are provided in series between two lines having different potentials.

9. A vehicle lamp, comprising:
a semiconductor light source; and
the lighting circuit according to claim 1.

10. A lighting circuit, comprising:
a thermal sensing element whose electrical state changes according to temperature of a semiconductor light source;
a current source configured to generate a drive current that shows a positive correlation with the temperature when the temperature is in a normal range and that shows a negative correlation with the temperature when the temperature falls within a high temperature range higher than the normal range;
a first temperature detecting unit configured to significantly change the drive current according to the temperature in the normal range; and
a second temperature detecting unit configured to significantly change the drive current according to the temperature in the high temperature range;
wherein the first temperature detecting unit includes a second resistor, and a second thermistor connected in parallel with the second resistor and having a negative temperature coefficient.

* * * * *